Figure 1:
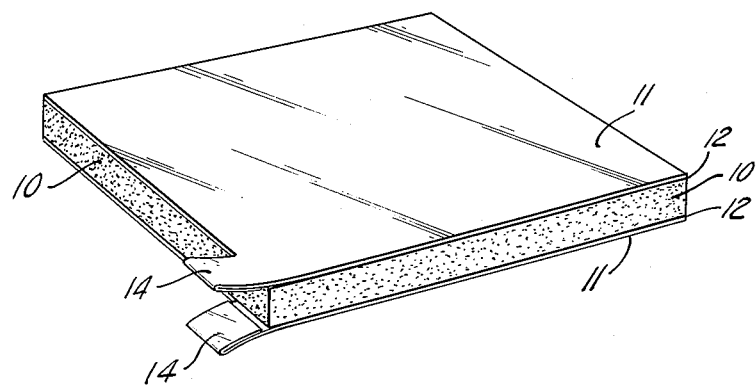

March 28, 1961

M. H. DOUTHITT 2,977,267

PACKAGING OF TACKY MATERIALS

Filed Dec. 6, 1955

# United States Patent Office 2,977,267
Patented Mar. 28, 1961

2,977,267

PACKAGING OF TACKY MATERIALS

Merton H. Douthitt, Ossining, N.Y., assignor to Texaco Development Corporation, New York, N.Y., a corporation of Delaware Filed Dec. 6, 1955, Ser. No. 551,374

2 Claims. (Cl. 154—79)

The instant invention relates to packaging of tacky or sticky solids and semi-solids and the resulting package.

Heretofore in packaging sticky solid and semi-solid materials, e.g., railroad tie pads, caulking compounds, expansion joints, slabs of sticky rubber, and the like, the necessity for rendering the solid pieces non-adhesive to one another and to extraneous surfaces in storage has been dealt with in a variety of ways. Thus, it is conventional to apply talc to the tacky exposed surfaces so that individual pieces can be separated or a reel of connected pieces can be unrolled. Another method has been to cover the sticky surface with a gelatinous or other temporary coating which disappears when the sticky article is put in service. Still another method has been to cover the sticky surface with a sheet material coated with a release agent of low adherence, e.g., waxed paper, cloth or paper treated with a waxy silicone polymer or a wax-fatty acid-synthetic resin film, plasticized polyethylene sheet, or the like.

The foregoing methods each have certain deficiencies. Unless absorbed by or scraped off the body of sticky solid, a talc coating can impair the ultimate adhesiveness of the solid body. Piling up of pieces of the coated solid in warehouses is frequently highly deleterious to a temporary nonadhesive coating such as gelatin. Ordinary packaging and storage can cause severe adhesion problems between covered sticky solids and various release agent-treated sheets such as waxy-feeling silicone-treated papers so as to destroy their clean peelability in time.

I have now found that use of a film of conventional pressure sensitive adhesive for bonding a covering of flexible sheet to a tacky solid or semi-solid core member permits easy, reliable, and complete stripping of the protective sheet from the core member, thereby exposing a desirable tacky surface either by uncovering the original surface of the core member, or by leaving a deposit of the pressure sensitive adhesive film at least in part of the surface of core member.

In the practice of my invention there can be a differential in adhesive bond strength between one side of the pressure adhesive film and the other, e.g., by a priming coat on one side of the sheet and/or a backsize on the other. If the film is less tenacious to the flexible sheet, the sheet can be pulled away from the core member, and in so doing, leave some or all of the pressure sensitive adhesive film stuck to the core member. In such instance the tape would be described as "offsetting." On the other hand, the adhesive bond between the core member and the film of pressure sensitive adhesive can be less tenacious than the bond between the flexible sheet and the film of adhesive so that, on peeling the sheet from the core, the pressure sensitive adhesive film stays with the sheet and the original surface of the core is exposed ("nonoffsetting"). In some applications it does not matter whether the film of adhesive stays with the core member or with the sheet, or partly on the sheet and partly on the core member; in other applications it can be desirable to leave a gummy deposit of pressure sensitive adhesive on the core member; in still other applications it can be desirable to expose the original tacky core member surface after removal of the sheet.

The drawings illustrate a packaged tacky core member, in this case a railroad tie pad, and one method of so packaging it. Item 10 of Figure 1 is a core member of the very tacky semi-solid pad material. Items 11 are flexible sheets strippable from the tacky core member and bonded thereto by virtue of films 12 of pressure sensitive adhesive. Tabs 14 project from the package to assist manual peeling of the sheet from the core.

Figure 2:
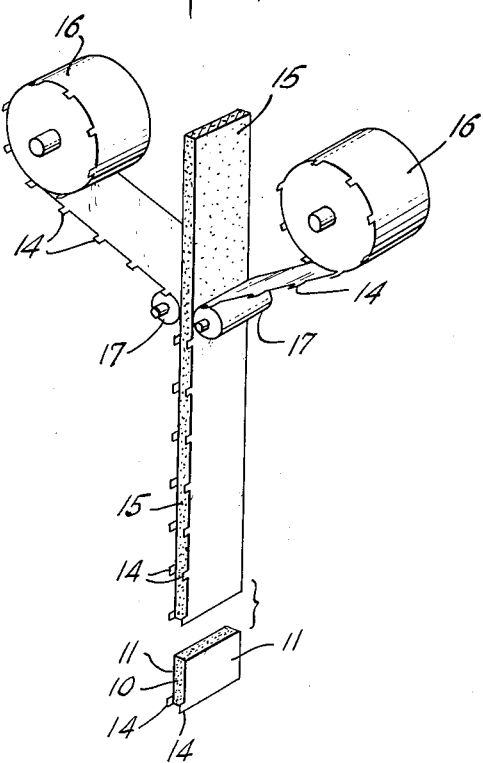

In Figure 2 a continuous strip of tacky core member 15 is passed downwardly into engagement with pressure sensitive tapes upwinding from reels 16, being pressed on by rolls 17. Both tape reels are made up with a plurality of projecting tabs 14 which overlap the strip of core member 15 as the tapes are applied thereto. The coated core member is then passed to conventional cutting machinery (not shown), and severed into pieces on lines between tab projections, thereby making the packaged pad as shown in Figure 1. The tabs assist one to initiate peeling of the flexible sheet from the core member and can be made larger if necessary or desirable. Alternately, the continuous sheet-covered core member can be only partly severed on lines between projecting tabs and then reeled up. Upon unreeling, pieces of the coated core member can be torn where scored by the partial severing.

Presently, the most important application of this invention is in the packaging of highly adhesive railroad tie pads which are articles which are composed of sticky bituminous mastic or are heavily coated with such bituminous mastic. Such tie pads may be expected to be stored under various climatic conditions and should be ready for field installation between tie plate and railroad tie without special tools and in rapid sequence.

An exemplary tie pad of this type is the Laudig railroad tie pad described in U.S. application Ser. No. 479,011 of James J. Laudig, filed December 31, 1954, and entitled Sealable Adhesive Composition, Tie Pad Comprising Same, and Process for Making Said Pad, now Patent No. 2,886,248, dated May 12, 1959. The mastic composition of the Laudig pad contains asphalt, pine tar, and a rubbery elastomer such as rubber. In the fresh state such pad sticks to the wood of the tie and the steel of the tie plate with extreme tenacity. When the pads are packaged according to the principles of my invention, the flexible sheet protects the pads from sticking together in a bundle or the like, maintains the desirable fresh sticky surface for prolonged periods, and is readily stripped by hand prior to use of the pad. In this instance deposition of part or all of the film of pressure sensitive adhesive on the pad surface can be permitted to occur without detracting from the desirable properties of the pad.

A flexible sheet covering useful in my invention can be a sheet of cellophane (coated or uncoated), tough paper, plastic such as polyethylene or polyester, or cloth such as cambric. The strength of the bond between the adhesive film and the sheet can be adjusted substantially as desired by selection of composition of adhesive body and prime coat intermediate between the film of adhesive body and the sheet.

As a variety of pressure sensitive adhesive tapes are presently on the market, I prefer to make the packaged article of my invention by wrapping it at least partially with such pressure sensitive tape with, of course, the adhesive side of the tape towards the tacky surface of the core member being packaged or otherwise covered. In addition to effecting surface protection during packing and storing such sticky articles, the method of my invention can be used for temporary covering of sticky surfaces to prevent their oxidation or their being coated with extraneous substances such as paint.

By a pressure sensitive adhesive I mean one which under ordinary atmospheric conditions is stably in a condition such that it does not need to be activated by solvents or heat or otherwise treated to secure strong adherence to a surface with which it is brought in contact. It has an aggressively tacky nature like the core member material.

A typical pressure sensitive adhesive tape suitable for my use will consist of a film of an adhesive mass, e.g., crepe rubber or other elastomer and ester gum or other tackifier and usually an anti-oxidant, a primer for the sheet backing if desired to prevent offsetting of the adhesive mass, e.g., crepe and reclaimed rubber and wood rosin or hydrogenated cumarone-indene resin, and a backing sheet of regenerated cellulose, cellulose ester or ether, glassine paper, textile fabric, chlorinated rubber, polymerized vinyl acetate chloride, or the like. If desired the nonadhesive side of the backing sheet can be treated with a backsize of release agent or repellent coat such as magnesium stearate or synthetic polymer to assist in unreeling the tape from a roll.

Suitable pressure sensitive adhesive tapes, primers, adhesive masses, backing sheets and backsizes useful in the practice of my invention are shown in the following U.S. Patents: 2,156,380, 2,179,339, 2,285,458, 2,319,959, 2,320,716, 2,392,639, 2,415,091, 2,413,931, 2,544,692, 2,553,816, 2,576,968, 2,177,627, 2,236,567, 2,328,057, 2,340,298, 2,201,877, 2,364,875, 2,395,419, 2,439,481, 2,548,980, and 2,607,711.

My invention can, of course, be practiced in other manners, e.g., the tacky article constituting the core member can be dipped, brushed, sprayed, or otherwise coated with a film of pressure sensitive adhesive or solution thereof, and then the flexible sheet can be applied over that.

The following examples show ways in which my invention has been practiced but are not to be construed as limiting the invention. All percentages are weight percentages.

*Example 1.*—To the surface of a slab of aggressively tacky mastic composition consisting of a blend of 56.7% air-blown asphalt having penetration between 35 and 40, 15% heavy naphthene base vacuum residuum having specific gravity of 0.9574 at 60° F., flash point (C.O.C.) of 510° F. and viscosity in Saybolt Furol seconds of 210° F. of 47, 8.3% high grade retort pine tar made by destructive distillation of wood from trees such as long leaf pine, and 20% pulverized reclaim rubber tire peel, there was applied several strips of "Scotch" brand cellophane-backed non-offsetting pressure adhesive tape substantially of the construction described in U.S.P. 2,177,-627. The tape was the product of the Minnesota Mining and Manufacturing Company. Successive portions of this tape were readily removable from the sticky slab by deliberate hand peeling so as to expose the original sticky mastic surface of the slab at various intervals of storage of the slab up to 6 months. At no time was the tape portion difficult to remove completely and cleanly. The freshly exposed surfaces of so-protected slab were glossy and unimpaired by this treatment. Cellophane and waxed paper, by way of contrast, clung tenaciously to the slab and were not cleanly peelable. Even glassine treated with a waxy-feeling silicone polymer mold release agent was difficult to strip from the slab; and torn patches of the glassine remained stuck fast in places.

*Example 2.*—To the surface of a stiff mass of white sticky caulking compound capable of adhering readily to wood or steel surfaces and containing whiting, white lead, linseed oil, and rubbery elastomer, there was applied a pressure sensitive adhesive tape of the type described in Example 1. The tape was readily and completely peelable by hand from the caulking compound to expose the sticky surface thereunder.

I claim:
1. In combination, an article of manufacture comprising a core member having a tacky surface containing rubbery elastomer, a flexible sheet, and a film of pressure-sensitive adhesive mass interposed between said sheet and said tacky surface and having composition different from said tacky surface, said sheet being bonded to said tacky surface and rendered strippable therefrom by said film of pressure-sensitive adhesive mass, said core member being a railroad tie pad in the form of a substantially rectangular slab and of a tacky composition containing asphalt, pine tar and a rubbery elastomer.

2. The process for covering a core member having a tacky surface containing rubbery elastomer with a flexible sheet which process comprises interposing between said sheet and said tacky surface a film of pressure-sensitive adhesive mass having a composition different from said tacky surface, said film of pressure-sensitive adhesive mass bonding aid sheet to said tacky surface and rendering said sheet strippable therefrom, said core member being a railroad tie pad comprising a composition containing asphalt, pine tar and rubbery elastomer.

References Cited in the file of this patent
UNITED STATES PATENTS

| | | |
|---|---|---|
| 2,021,370 | Mallay | Nov. 19, 1935 |
| 2,191,704 | Bennett | Feb. 27, 1940 |
| 2,292,024 | Dreher | Aug. 4, 1942 |
| 2,556,078 | Francis | June 5, 1951 |
| 2,593,010 | Clarvol | Apr. 15, 1952 |
| 2,688,005 | Clayton et al. | Aug. 31, 1954 |
| 2,770,421 | Wilson | Nov. 13, 1956 |